July 5, 1966 A. W. HOLT 3,259,884

READING MACHINE WITH SERIAL STORAGE AND PARALLEL READOUT

Filed Sept. 25, 1963 2 Sheets-Sheet 1

INVENTOR
Arthur W. Holt

BY Joseph A. Genovese & Max L. Libman

ATTORNEYS

INVENTOR
Arthur W. Holt
BY Joseph A. Genovese & Max L. Libman
ATTORNEYS

United States Patent Office 3,259,884

Patented July 5, 1966

3,259,884

READING MACHINE WITH SERIAL STORAGE AND PARALLEL READOUT

Arthur W. Holt, Silver Spring, Md., assignor, by mesne assignments, to Control Data Corporation, Minneapolis, Minn., a corporation of Minnesota Filed Sept. 25, 1963, Ser. No. 311,349

10 Claims. (Cl. 340—146.3)

This invention relates to reading machines and particularly to optical character recognition machines.

Although enormous effort has been directed toward the development of reading machines, commercially available machines are expensive and complex. An object of my invention is to provide an inherently simple reading machine.

In attaining this objective my machine can use any conventional scanner capable of extracting information from the characters and their background areas, and providing outputs corresponding to the "white" (character background) and the "black" (character on the background). The manner that the scan-information is processed by my invention leads to the desired economies and simplicity in the art of identifying characters by machines.

Although the image of an unknown character (to be identified) can be scanned in substantially any manner, I serially record the scan information or data (defined as signals derived from the outputs of the scanner) in a moving mechanical medium in a manner such that the recorded information corresponds to end-to-end slices of the entire character area. As the scan-data is recorded on the moving medium, specially configured logic members interrogate the medium at specific predetermined points (or small areas) to ascertain the degree of match between the recorded scan-data and each possible character that the machine is expected to identify. Herein lies an important feature of my invention. The medium-interrogating logic members, by their configuration (discussed later), perform the functions of (a) interrogating the recorded scan-data as it moves with the medium; (b) establishing the character criteria for the characters of the set to be identified; and (c) combining individual signals to provide a new signal representing the degree of match between the scan-data and criteria.

The moving mechanical medium can be of several kinds, for example, electrostatic, or electro-luminescent. Actual recording is accomplished by known means, e.g. as disclosed (both electrostatic and electro-luminescent) in Engineering Report, 1953, by Engineering Research Associates, St. Paul, Minn. In the case of electrostatic recording of the scan-data, the logic members can be constructed as "combs" with the spacing of the teeth corresponding to the expected configuration of the serial information recorded on the medium. Thus, each logic member will have a different arrangement of teeth to correspond to the character which it represents. The recognition logic is formed by the number and spacing of teeth of the various character-representative members. In the case of electro-luminescent recording the members can be constructed of masks utilized with individual photocells, there being only one photocell necessary for each mask. In each case, however, the entire logic of the machine including the combining of data extracted from the medium, is contained in the simple comb or design of masks. An important advantage of my logic member feature is that one amplifier is required for each "comb" or mask.

For recognition of some characters it is just as important to know that there is no character part in a specific location, as it is to know that a part of a character is present at a particular place. For instance, the absence of a tail distinguishes an "O" from a "Q." Thus, I prefer to make two sets of recordings of the entire character area, one being the inverse of the other. From the pair of recordings I am able to simultaneously extract both "assertion" and "negation" (defined below) information from the memory device by means of the above logic members to assist the character recognition for most of the characters, and to make possible recognition of characters which are sub-sets of others, (e.g. "F" and "E," "O" and "Q," etc.).

The "assertion" and "negation" techniques are described in Patent No. 3,104,369. Briefly, an assertion is an output signal resulting from a part, point, piece, etc. of a character where one is expected. A negation is defined as an output signal representing a point, part, piece, etc., of a character background where the character background is expected, and is useful in distinguishing two or more characters. In a practical case, a "E" and a "F" are difficult to distinguish because all of the points of the "F" will satisfy points of the "E." Therefore, using assertion and negation techniques, the "F" is identified because it has a vertical feature (or points representing the vertical feature), and two horizontal features, plus no feature (negation) at the lower horizontal station corresponding to the lower horizontal feature of the "E." In addition, my invention makes use of the "weighting" technique similar to that described in the above patent, which enables the machine to optically or electrically stress important points, parts, etc. of a character.

My invention provides a novel technique, in the form of the above discussed logic members for using assertion and negation information (weighted when desired) which is extracted from the total recording of the entire character and its background. It is emphasized that the logic members contain the simple expedient of probes, fingers, teeth, masks, or the like, configured to represent the serially presented, colinear "slices" of the character and its background.

A feature of my invention is that the central reading machine can easily be adjusted to identify any character (including patterns of all kinds) by changing (or adjusting) the probes, teeth, fingers, etc. of the logic members.

Other objects and features of importance will become apparent in following the description of the illustrated embodiments of my invention.

FIGURE 1 is a diagrammatic view showing a reading machine in accordance with my invention.

FIGURE 1*a* is a graphic representation of a character on a background area which is subdivided to facilitate understanding of my invention.

FIGURE 1*b* is a view similar to FIGURE 1*a* but showing a different character.

FIGURE 2 is an enlarged sectional view taken on line 2—2 of FIGURE 1.

FIGURE 2*a* is a fragmentary side view showing one of the stationary logic members adjacent to the periphery of the recording medium of FIGURES 1 and 2.

The following description pertains to a reading machine capable of identifying characters of a "four-by-five" font (FIGURES 1*a* and 1*b*), although it is understood that one of the advantages of my invention, apart from simplicity, is that the reading machine logic can be easily adjusted to enable the machine to identify characters of any font. The illustrated character "4" and "H" are on a five-by-seven grid where the letters (*a, b, c, d* and *e*) refer to vertical scans or scan traces, as by a vertical row of photocells, an apertured disc, etc. For the purpose of explanation it is assumed that scanner 8 is a disc (not shown) having apertures 9 (FIGURES 1*a* and 1*b*) which traverse the character image along vertical traces *a–e*, and the scanner outputs are clocked at times 1–7 during each scan trace. This is conventional.

Figures 1, 1A, 1B, 3:
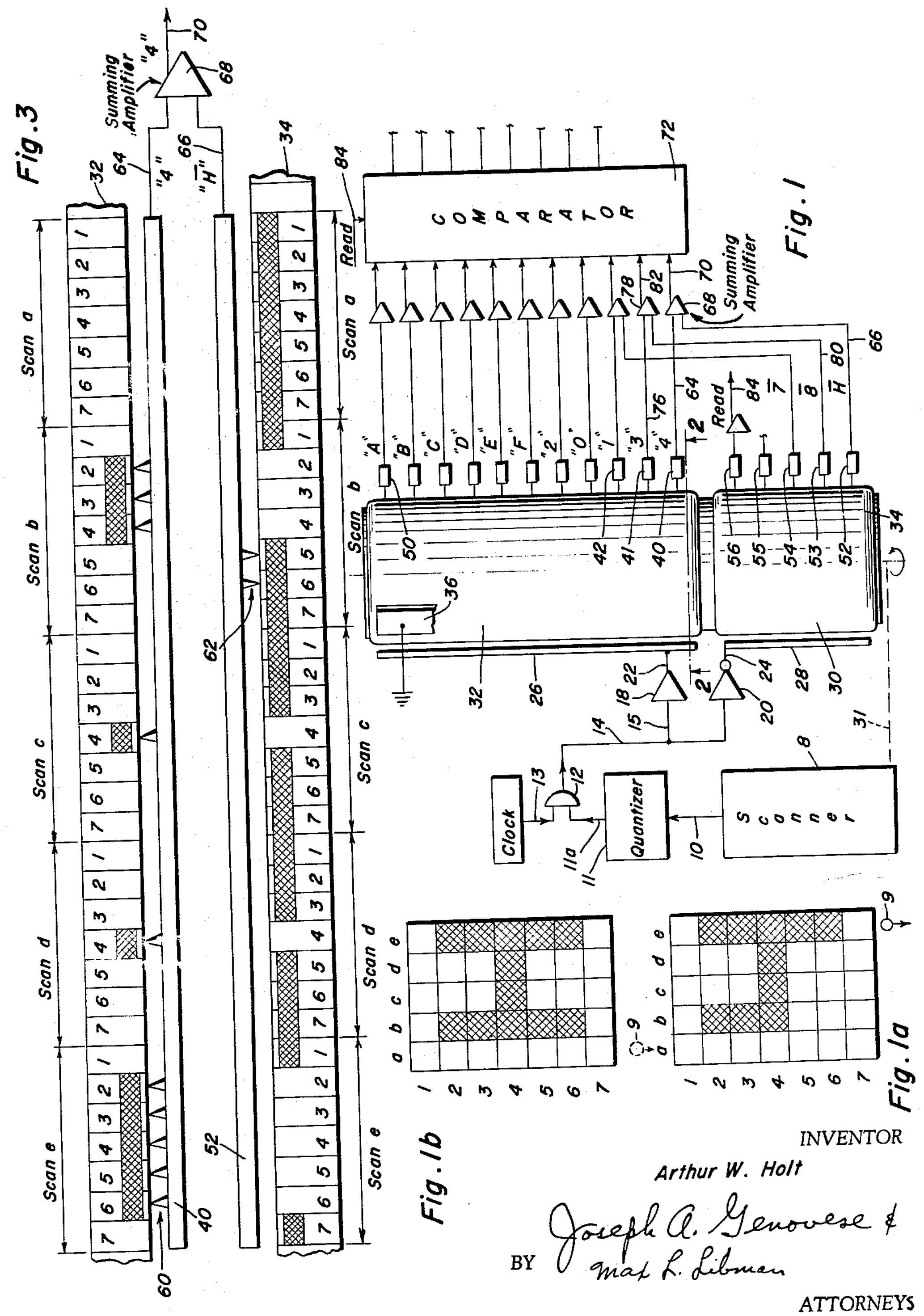
FIGURE 3 is a diagrammatic development of a part of the surface of a recording medium, with the dark areas representing the recorded scan-data for the assertion information and the negation information respectively, and further showing the relationship between the logic members and the assertion and negation recordings.

In FIGURE 1, scanner 8 (photocell and preamplifier not shown) has output line 10 which conducts the scanner outputs as a continuous analog signal during the time that scan hole vertically traverses the area of, for instance, FIGURE 1*a*. The scanner outputs are conducted on line 10 in a manner such that the scan information corresponds to end-to-end slices of the character and its background. These outputs are conducted by line 10 to quantizer 11 whose output line **11*a* forms an input to AND gate 12. The other input of gate 12 is on line 13** from a clock pulse source designed to provide clock signals at times 1–7 (FIGURE 1*a*) during each scan trace *a–e*. (Quantizer 11 can be constructed as a single threshold device, or as a multithreshold device as in the S. Greenwald Patent No. 3,166,743 to account not only for "black" and "white" but also for shades of gray in the printed character. The only required modification of the Greenwald circuit is connecting the two Greenwald output wires by means of a resistive coupling to have a single output wire **11*a*.) Thus, the outputs on line 14 from gate 12 can be of two or more levels (or analog signals by omitting quantizer 11), and the gate outputs signals on lines 14 and 15 (attached to line 14) are impressed on amplifier 18 and inverting amplifier 20. Lines 22 and 24 from amplifiers 18 and 20 conduct the amplified scanner outputs to recording devices 26 and 28 which are stationary with respect to the recording medium 30 I have indicated that the recording medium 30 can be electrostatic as at 30 (FIGURES 1 and 2), or at 30*a* (FIGURE 4) or electro-luminescent at 30*b* (FIGURE 5), or any other equivalent medium capable of being mechanically synchronized with the scanner. By this is meant the movement of medium 30 (or 30*a*, or 30*b*) is mechanically coupled (or unitary with) scanner 8 (coupling shown by dotted line 31 in FIGURE 1) in a manner such that the speed at which the scan elements 9** traverse the character area is a function of the speed of the recording (storage) medium.

Figure 2:
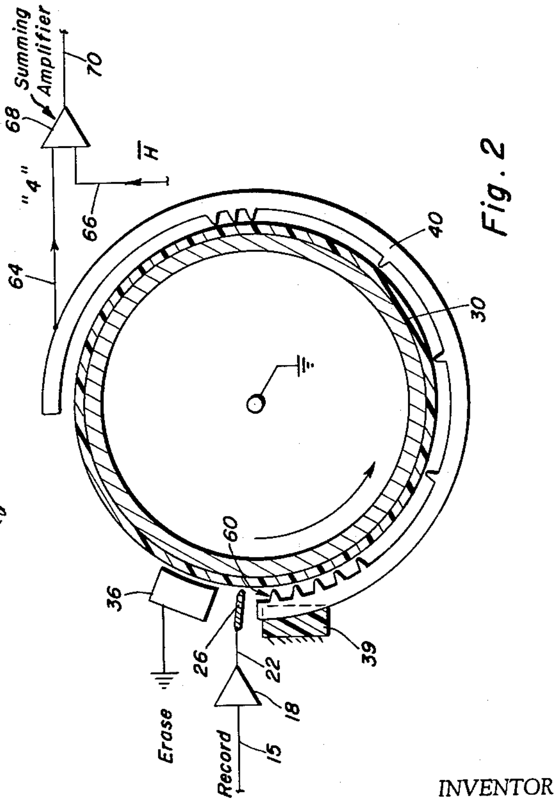

First considering the electrostatic medium 30 as a memory device (FIGURES 1 and 2) of the reading machine, the medium can be a grounded metal drum having dielectric film surfaces 32 and 34 (although a single surface is equally satisfactory). Surfaces 32 and 34 can be made of any suitable material having sufficient dielectric strength, as Mylar, polystyrene, and others. Recording devices 26, 28 can be wires, knife edges, or any other electrical conductor suitable for corona-discharge recording. The physics of the recording is described in prior patents as well as the previously identified publication. An erase device 36 is mounted adjacent to the drum medium 30, and connected to ground or to a discharging potential source (not shown). Satisfactory results have been obtained by using a contacting felt pad, wet with alcohol or water, while flame erasing is also possible. As shown in FIGURE 2, the erase device is located adjacent the recording devices 26, 28 and in front of them with respect to the direction of rotation of medium 30. Accordingly, the medium is automatically erased just prior the recording of scan information by devices 26, 28.

FIGURE 3 shows developments of surfaces 32, 34 with recorded information as it will occur when the character "4" (FIGURE 1*a*) is scanned. Scans *a, b, c, d* and *e* are designated, while clock positions 1–7 in each scan trace are indicated on the developments of the recording surfaces 32, 34. The dark areas on surface 32 represent portions of the character "4" as they will appear by recording the scan data (for instance as positive signals when the "black" is detected), and when the scans are serially recorded end-to-end. Since amplifier 20 is an inverting amplifier, device 28 will record a charge on surface 34 (represented by the dark areas of the lower part of FIGURE 3) when the character background ("white") is detected during each scan, and will have either no charge or a distinguishable charge when the scanner detects a portion of the character ("black") during a scan trace. Thus, the recordings on surfaces 32 and 34 contain all of the information extracted from the character and its background. The separate and complete recordings on surfaces 32 and 34 correspond to two separate, inverted representations of the character and its background.

Figure 2A:
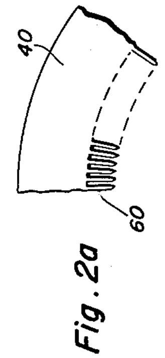

Although the outputs of the scanner are recorded serially, they are read out in parallel in the sense that stationarily mounted (as by bracket 39, FIGURE 2) logic members 40, 41, 42 . . . . 50 (FIGURE 1) simultaneously examine the recorded data on surface 32 for specific serial patterns (discussed later). Logic members 52, 53 . . . 56 (FIGURE 1) also simultaneously examine the information recorded on surface 34 for specific patterns. Each logic member, for example member 40 in FIGURES 2 and 2*a*, is simple in construction. For the electrostatic embodiment (FIGURES 1 and 2) I can use a conductive comb having a plurality of regularly spaced teeth 60 (FIGURE 2*a*) to start with, and remove the undesired teeth to establish the desired spatial pattern of remaining teeth. Of course, the logic members can be manufactured in other ways. However, after the first machine has been made establishing the best tooth pattern, subsequent identical members (for additional reading machines) can be copies. Teeth 60 in FIGURES 2 and 3 are in a pattern required for the assertion information pertaining to the logic for recognition of the character "4." Therefore, the teeth in FIGURE 2 (more clearly but diagrammatically shown in the upper part of FIGURE 3) are so spaced that as the drum rotates, there will be a relationship between the logic member 40 and the drum such that the teeth 60 will be directly opposite and capacitively coupled with the recorded signals (on surface 32, FIGURE 3) which were recorded during the scanning of the "4" of FIGURE 1*a*. This figure also shows that during scan *b* positions 5 and 6 the scanner detects the character background, but as used in the lower part of FIGURE 3, this information is "negation" information which is read out by the teeth 62. The significance is that the "4" shown in FIGURE 1*a* is identified as a "4" not only because of its configuration but also because it contains no "black" at the places where the "4" could be confused with or indistinguishable from the "H" of FIGURE 1*b*. For weighting, additional teeth 60 and/or 62 are provided on the members 40–55 directly behind existing teeth (as viewed in FIGURE 2).

To the right of FIGURE 3 there are output lines 64, 66 attached to logic members 40, 52 and connected to summing amplifier 68. The output line 70 of the summing amplifier 68 is operatively connected with comparator 72 (FIGURE 1) which can be similar to the comparator disclosed in Patent No. 3,104,369. Line 70 conducts a signal which corresponds to the degree of match between the scanned unknown character and the character "4" for which members 40 and 52 are designed, that is, by the number and spacing of the teeth 60 and 62.

Returning to FIGURE 1, it is evident that each of the assertion members 40–50 inclusive has an output line similar to line 64, and each of the output lines is connected to an input to an amplifier like amplifier 68. Certain characters can be identified without the aid of negations, particularly if the reading machine is expected to identify only a small number of characters. Thus, some of the amplifiers 68 are shown as single-input devices, but others are shown as summing amplifiers with one input from an assertion logic member and the other input from a negation logic member. To carry the explanation further, the logic member 41 for the character "3" has an output line 76 forming one input to its amplifier 78. The negation member 53 "negates" the "3" against the character "8" in a manner similar to that described in connection with "4" and "H." Therefore, line 80 from negation logic member 53 is the other input to summing amplifier 78, and the output line 82 of the summing amplifier is connected as an input to comparator 72.

Figure 4:
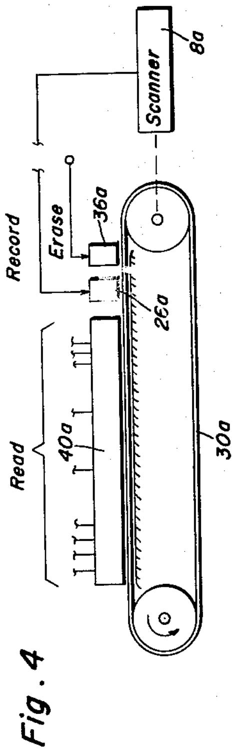
FIGURE 4 is a schematic view showing a modification.

FIGURE 4 shows a modification indicating that recording medium 30*a* need not be a drum, but can be of other forms such as a tape. The illustrated scanner 8*a*, record device 26*a*, erase device 36*a*, and read members are essentially the same as their counterparts in FIGURES 1–3. The read member 40*a* is straight to conform to tape 30*a*, instead of being curved (FIGURE 2) to conform to a drum. Only one read member 40*a* is shown in FIGURE 4, it being understood that the other read members (corresponding to 41–56 of FIGURE 1) are located behind member 40*a* as viewed in FIGURE 4.

Figure 6:
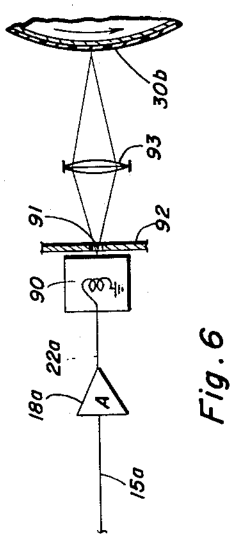
FIGURE 6 is a schematic view showing a method of electro-luminescent recording.
Figure 5:
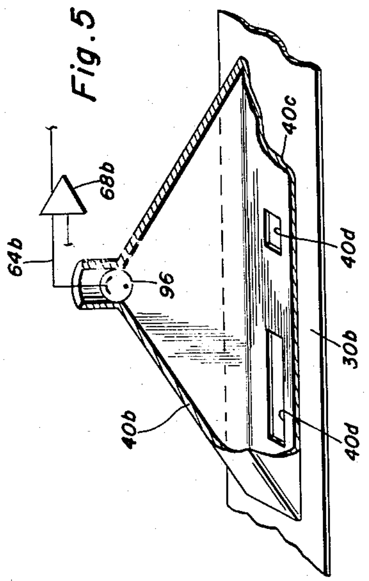
FIGURE 5 is a schematic view showing another modification using an electro-luminescent recording medium.

FIGURE 5 shows another modification where the recording medium 30*b* is electro-luminescent, as a phosphor coated drum (FIGURE 6), tape or other surface bearing a luminescent medium. Reading (FIGURE 6) is accomplished by a suitable light source 90 energized (or controlled) by the scan-data signal on line 15*a* which is amplified at 18*a* and conducted to the lamp (e.g. a quartz crystal lamp) via line 22*a*. A slot 91 in mask 92 is located in front of source 90, and lens 93 is optically aligned with the slot-source assembly to form a line of light on the phosphor (or the like) surface of member 30*b*. Analog recording is possible by using analog signals on line 22*a* to control lamp intensity, while digital recording is possible by having the signals on line 22*a* turn the lamp on and off. In either case, separate channels including two amplifiers (corresponding to 18 and 20 in FIGURE 1), two light sources and optical systems like the one shown in FIGURE 6 are preferred.

The single fragmentarily illustrated logic member 40*b* is composed of a housing which is light-tight except for the bottom wall 40*c*. (There will be a separate member for each character.) The bottom wall is superimposed with respect to the recording medium that has apertures or transparent windows 40*d* corresponding to the expected configuration of the recorded scan-data (as shown in FIGURE 3) for a particular unknown character represented by logic member 40*b*. A single photocell 96 is exposed to the interior of the housing to measure the total light transmitted through the transparent window 40*d* and provide a signal on line 64*b* which is conducted to amplifier 68*b*. Amplifier 68*b* is similar in function to amplifier 68 shown in FIGURE 1. Instead of measuring the total light transconducted into housing 40*b*, specific points of interest (the transparent portions) of mask 40*c*. Medium 36*b* can be erased by any suitable means, for instance by an infra red energy source. In this embodiment weighting is achieved by using gray masks over or in selected windows 40*d*, as disclosed in Patent No. 3,167,744.

It is ordinarily important in a reading machine to know when to trigger the comparator (make the character decision). There are many methods of providing "read" trigger signals, and therefore, a simple one is illustrated in FIGURE 1. As shown in FIGURES 1*a* and 1*b*, the signal resulting from scan trace "*a*" and recorded on the surface 34 (see scan *a*, positions 1–7 at the bottom of FIGURE 3) will correspond to complete "white" which can be detected by negation logic member 56 (FIGURE 1) having all of its teeth removed except those opposing the position on the development of surface 34 at scan *a*, positions 1–7 inclusive. I can require the clear "white" vertical space on both sides of the character (rather than only one side as shown in FIGURE 1*a*) by designing member 56 with its teeth to seek recorded signals at both the front and trailing edges of the character.

It is understood that numerous changes, alterations and other modifications may be made without departing from the protection of the following claims.

I claim:

1. In an optical character reading machine, means to scan an unknown character and provide outputs corresponding to areas of the character, and storage means to store signals corresponding to said outputs, the improvement comprising a plurality of unitary logic members which establish the character-criteria and form the reading means for said storage means, each member having elements whose physical spacing corresponds to the expected pattern of stored signals for the character represented by the member, and each member providing a character-identity signal derived from the sum of the signals detected by its elements.

2. The reading machine of claim 1 wherein said storage means has a movable storage medium, and said logic members are stationarily disposed adjacent to said medium.

3. In an optical character reading machine, means to examine a character and provide serial outputs corresponding to the character and its background, movable means for serially storing said outputs in a manner such that the stored information corresponds to end-to-end slices of the character and its background, a plurality of unitary logic members associated with said movable means to concurrently sense said stored information, said members corresponding to the characters which the machine is capable of identifying, and said members defining the character-identity logic of the machine by respectively examining predetermined portions of said stored information which pertains to the configuration of the character represented by the individual member.

4. The reading machine of claim 3 wherein the last-mentioned member has an information sensing element for each predetermined portion of said recorded information to be examined, and said member combining the information detected by its elements and providing a signal on which to base a character-identity decision.

5. The reading machine of claim 4 wherein there are, for at least one character, two of said members, one having elements for portions of the character which it represents and the other having elements to examine the recorded information for portions of the character background, both of said two members providing output signals which correspond to the sum of the satisfied elements of said two members, and means to combine said output signals and provide a new signal on which to base a character-identity signal.

6. The reading machine of claim 5 wherein said storing means is an electrostatic medium, and said elements of said logic members are teeth.

7. The reading machine of claim 5 wherein said storing means is an electro-luminescent medium, and said elements of said logic members are windows in a mask adjacent to said medium.

8. The reading machine of claim 4 wherein one of said logic members comprises a group of detecting elements whose positions relative to each other correspond to the expected positions of character-defining recorded data pertaining to the character which the member represents, and a single amplifier for the combined signal detected by each of the detecting elements of said member.

9. In an optical character reading machine, scanning means to examine a character and its background area and provide outputs corresponding to said character and area, movable means including a recording medium synchronized with said scanning means for recording said outputs in a manner such that the recorded information corresponds to said character and background area, a plurality of logic members associated with said recording medium, said logic members having elements spacially arranged to represent a particular character of a set of characters capable of being identified by the reading machine, said logic members concurrently examining said recorded information as said medium moves, said elements of said logic members being combined by their members to combine the recorded information detected by each element for its member, each member providing an output signal which corresponds to the combined information, and means to compare all of said output signals to identify the examined character.

10. The reading machine of claim 9 wherein there is a single logic member for each character of the set to be identified by the reading machine, and at least one additional member sensitive to a recorded signal corresponding to the negation of an unknown character feature, and said output signal providing means corresponding to said additional logic member and one of the first mentioned logic members with which it is associated, for providing a combined signal for said comparing means.

References Cited by the Examiner

UNITED STATES PATENTS

| | | | |
|---|---|---|---|
| 2,318,591 | 5/1943 | Couffignal | 340—174.4 |
| 2,517,587 | 8/1950 | Mohr | 340—174 |

MAYNARD R. WILBUR, *Primary Examiner.*

MALCOLM A. MORRISON, *Examiner.*

J. E. SMITH, *Assistant Examiner.*